United States Patent [19]

Vitruk et al.

[11] Patent Number: 5,953,360
[45] Date of Patent: *Sep. 14, 1999

[54] ALL METAL ELECTRODE SEALED GAS LASER

[75] Inventors: Peter Vitruk, Bothell; Jeffery Alan Broderick, Seattle, both of Wash.

[73] Assignee: Synrad, Inc., Mukilteo, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/957,417

[22] Filed: Oct. 24, 1997

[51] Int. Cl.⁶ .................................................. H01S 3/097
[52] U.S. Cl. .............................. 372/87; 372/76; 372/81
[58] Field of Search .................................. 372/87, 76, 81, 372/83, 88

[56] References Cited

U.S. PATENT DOCUMENTS

| | | | |
|---|---|---|---|
| 4,433,418 | 2/1984 | Smith | 372/95 |
| 4,719,639 | 1/1988 | Tulip | 372/66 |
| 4,805,182 | 2/1989 | Laakmann | 372/82 |
| 5,048,048 | 9/1991 | Nishimae et al. | 372/95 |
| 5,065,405 | 11/1991 | Laakmann et al. | 372/92 |
| 5,123,028 | 6/1992 | Hobart et al. | 372/95 |
| 5,220,577 | 6/1993 | Opower | 372/92 |
| 5,392,308 | 2/1995 | Welch et al. | 372/92 |
| 5,602,865 | 2/1997 | Laakmann | 372/81 |

OTHER PUBLICATIONS

Raizer, Shneider and Yatsenko, "Radio–Frequency Capacitive Discharges," pp. 246 & 247, published 1995. (No month).

Lowke, Phelps and Irwin, "Predicted Electron Transport Coefficients and Operating Characteristics of $CO_2$–$N_2$–He Laser Mixtures," *J. Appl. Phys.*, 44:4664–4672, Oct. 1973.

Primary Examiner—James W. Davie
Attorney, Agent, or Firm—Seed and Berry LLP

[57] ABSTRACT

A gas laser includes a plurality of electrically conductive electrodes contained within a hollow housing that contains a laser gas medium. The electrodes surround and define a laser bore in which a plasma is excited by the electrodes. Each of the electrodes defining the laser bore has an ungrounded electrical potential that provides improved laser gain at a lower gas temperature. Each of the electrodes may be driven with a controlled, varying electrical potential, such as a radio frequency electrical potential.

35 Claims, 7 Drawing Sheets

ALL METAL ELECTRODE SEALED GAS LASER

TECHNICAL FIELD

The present invention relates generally to lasers, and more particularly, to all metal electrode gas lasers.

BACKGROUND OF THE INVENTION

Sealed gas lasers are employed in a large number of applications because of their compact size, reliability, and relative ease of manufacture. One such laser is disclosed in U.S. Pat. No. 4,805,182, issued to Peter Laakmann (the Laakmann patent), assigned to the assignee of the present invention and incorporated by reference herein in its entirety. The Laakmann patent discloses an all metal sealed gas laser that allows for an inexpensive manufacturing process while achieving excellent performance in laser power and operating efficiency.

Figure 1:
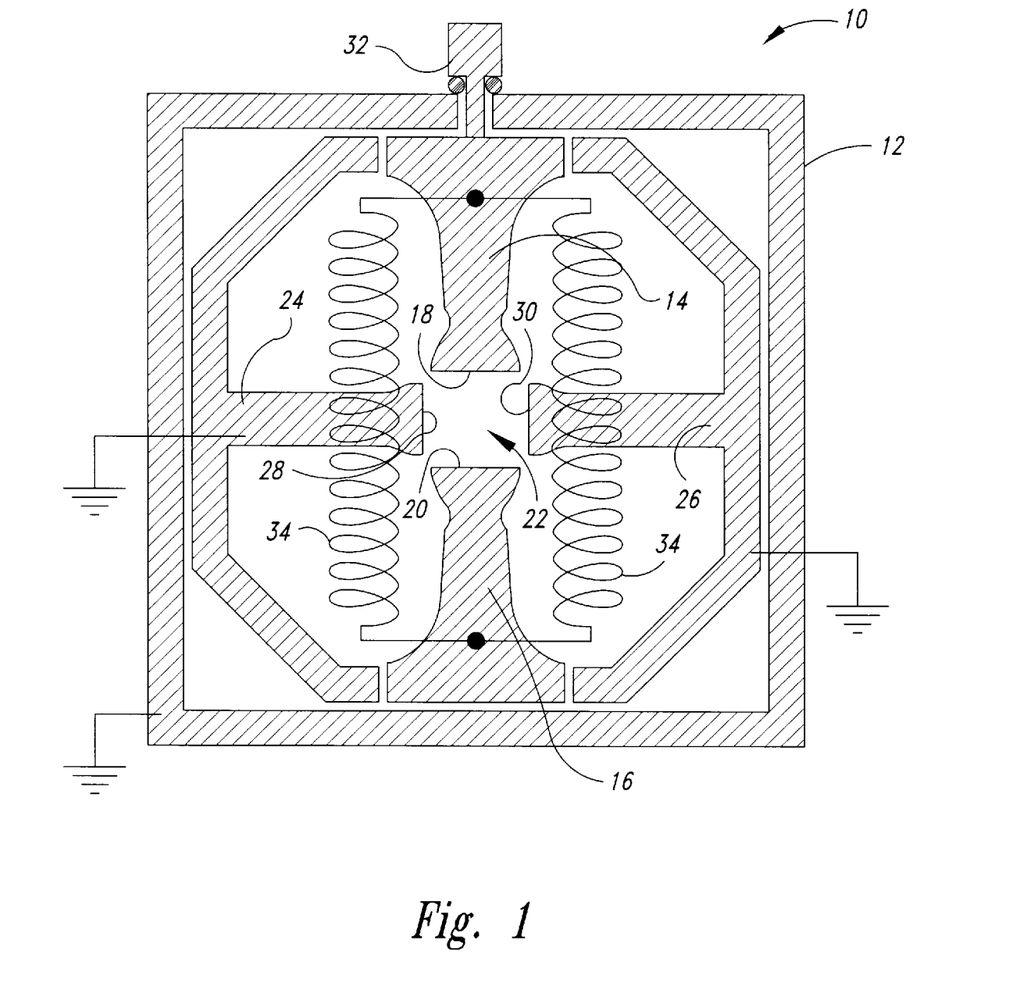
FIG. 1 is a cross-sectional view of an all metal electrode sealed gas laser according to the prior art.

A prior art all metal sealed gas laser 10 covered by the Laakmann patent is shown in FIG. 1. The laser 10 includes an aluminum housing 12 containing a laser gas medium, such as carbon dioxide. Within the housing 12 are first and second electrodes 14, 16 having electrode surfaces 18, 20 facing each other across a laser bore 22. Also enclosed within the housing 12 are grounded first and second wall members 24, 26 having wall surfaces 28, 30 that, together with the electrode surfaces 18, 20, surround and define the laser bore 22. Input line 32 is coupled between the first and second electrodes 14, 16 and an RF power source (not shown). The first electrode 14 is coupled to the second electrode 16 by a plurality of coils 34 so as to provide anti-phase excitation of the electrodes.

Although the laser 10 achieves excellent laser power performance, the overall efficiency is less than optimum because of plasma losses to the grounded wall members 24, 26. Such plasma losses are caused by electrons within the plasma re-combining with ions on the wall surfaces 28, 30. The grounded wall members 24, 26 also cause the laser gain to have a different spatial distribution in the horizontal direction than in the vertical direction.

SUMMARY OF THE INVENTION

An embodiment of the present invention is directed to a gas laser with improved spatial distribution of laser gain. The gas laser includes a plurality of electrically conductive electrodes contained within a hollow housing that contains a laser gas medium. The electrodes surround and define a laser bore in which a plasma is excited by the electrodes. In contrast to prior art gas lasers, each of the electrode surfaces defining the laser bore has an ungrounded electrical potential that together provide improved laser gain at a lower gas temperature.

In one embodiment of the invention, each of the electrodes is driven with a controlled, varying electrical potential, such as a radio frequency electrical potential. The laser bore may be surrounded by four electrode surfaces: two for each of two electrodes driven in anti-phase excitation. Alternatively, the laser bore may be surrounded by four separate electrodes driven with quarter-period phase-shifted varying electrical potential. Driving each of the electrode surfaces with a varying electrical potential produces an ion sheath on the perimeter of the laser bore, which reduces plasma losses within the laser bore.

DETAILED DESCRIPTION OF THE INVENTION

Figure 2:
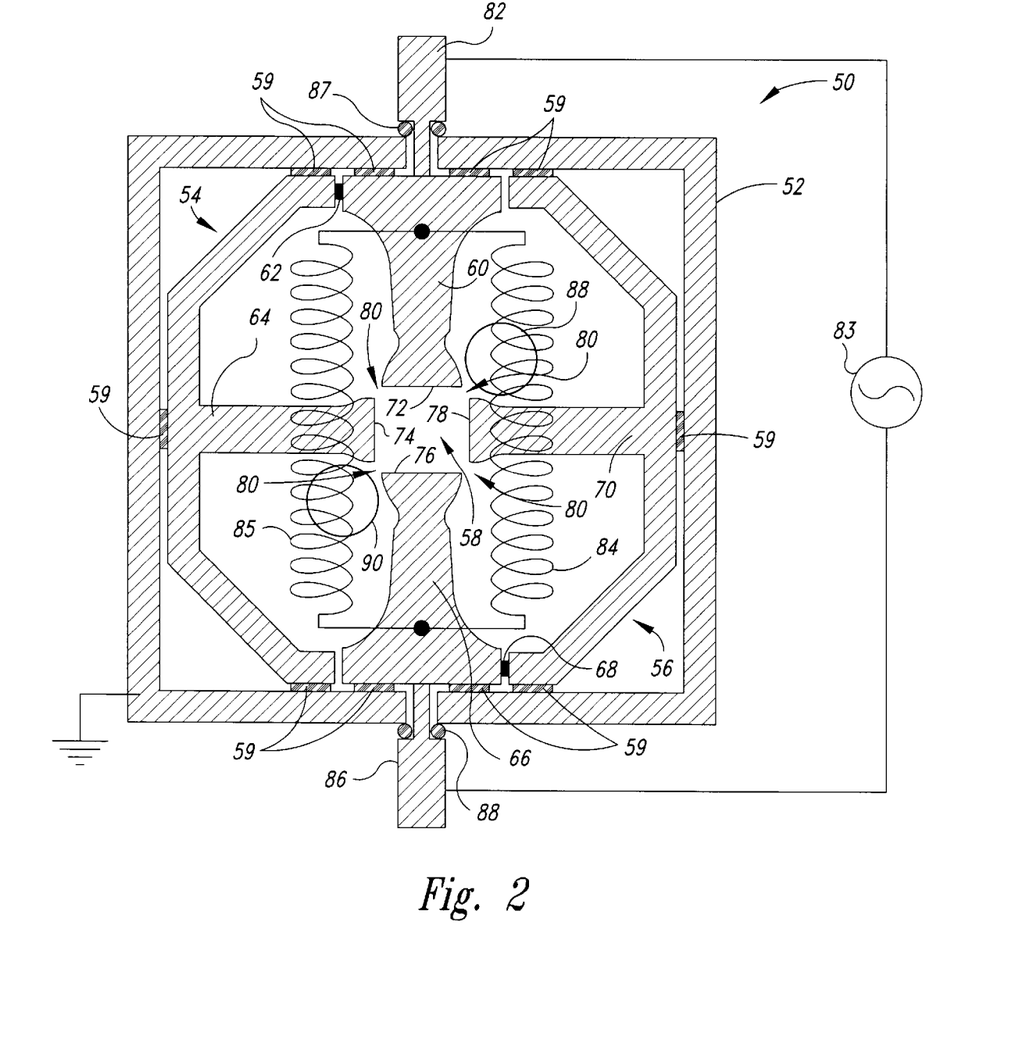
FIG. 2 is a cross-sectional view of a sealed gas laser according to a first embodiment of the present invention.

A sealed gas laser 50 according to a first embodiment of the present invention is shown in FIG. 2. The gas laser 50 includes a hollow metal housing 52 containing a laser gas medium. Contained within the housing 52 are first and second metal electrodes 54, 56 that form a rectangular, longitudinally extending laser bore 58 in which a laser beam is created. The housing 52 and electrodes 54, 56 are elongated in a dimension that extend into and out of the page of FIG. 2. A set of insulating spacers 59 support and insulate the electrodes 54, 56 from the housing 52. The first electrode 54 includes a first electrode arm 60 coupled by a first brass ball 62 to a second electrode arm 64. Similarly, the second electrode 56 includes a first electrode arm 66 coupled by a second metallic ball 68 to a second electrode arm 70. It will be appreciated that numerous electrically conducting connectors could be employed in place of the metallic balls 62, 68, and that the first and second electrodes 54, 56 could each be of an integral, unitary construction.

In contrast to prior art lasers, the first and second electrodes 54, 56 surround and define the laser bore 58 on four sides. The first and second electrode arms 60, 64 of the first electrode 54 include first and second electrode surfaces 72, 74, respectively, that define two perpendicular sides of the laser bore 58. Similarly, the first and second electrode arms 66, 70 of the second electrode 56 include first and second electrode surfaces 76, 78, respectively, that define another two perpendicular sides of the laser bore 58 and face the first and second electrode surfaces 72, 74, respectively, of the first electrode 54.

Spaces or gas gaps 80 are provided at the corners of the laser bore 58 in a dimension of about 0.001 to 0.010 inches between the adjacent electrode surfaces 72–78 to insulate the electrode surfaces 72–78 from each other. The gas gaps 80 also permit transverse gas exchange between the plasma within the laser bore 58 and the gas medium within the housing 52 outside of the laser bore 58. This provides gas convection cooling as well as a continuous supply of fresh gas. Alternatively or in addition, two or more of the electrode surfaces 72–78 can be anodized to provide additional insulation between the adjacent electrode surfaces. Anodizing two of the parallel surfaces of the four electrode surfaces 72–78 also provides polarization of the laser beam to be parallel to surfaces 72–78.

The first electrode 54 is coupled by a first input line 82 to a controlled power source 83 and by first and second coils 84, 85 to the second electrode 56. The second electrode 56 also is coupled to the power source 83 by a second input line 86. The input lines 82, 86 are supported on, and insulated from, the housing 52 by nonconductive O-rings 87, 88. The power source 83 may be a radio frequency source in the range of 20–200 megahertz to provide bi-phase excitation in which the instantaneous voltages of the electrodes 54, 56 are 180 degrees out of phase with respect to each other. The electrical excitation can be either continuous wave (CW) or pulsed, and any alternating current frequency can be employed such as RF. In contrast to prior art lasers employing grounded sidewalls, each of the four electrode surfaces 72–78 is driven with an ungrounded, alternating excitation for better optimized spatial distribution of laser gain.

When excited by the power source 83 via the input line 82, the electrodes 54, 56 form a discharge plasma in the laser bore 58. It will be appreciated that the laser 50 also includes, at opposite longitudinal ends of the laser bore 58, resonator mirrors (not shown) that form a laser beam from the discharge plasma within the laser bore. In addition, one of the resonator mirrors typically would be semi-reflective to enable a portion of the laser beam formed in the laser bore 58 to be output from the laser 50.

Driving the electrodes 54, 56, if left unimpeded, would also form a discharge plasma outside the laser bore 58 adjacent the gas gaps 80 between the first arm 60 of the first electrode 54 and the second arm 70 of the second electrode 56, and between the second arm 64 of the first electrode 54 and the first arm 66 of the second electrode 56. To prevent such formation of discharge plasma outside the laser bore 58, the gas laser 50 includes first and second electrically neutral plasma spacers 88, 90. The first plasma spacer 88 insulates the first arm 60 of the first electrode 54 from the second arm 70 of the second electrode 56. The second plasma spacer 90 insulates the second arm 64 of the first electrode 54 from the first arm 66 of the second electrode 56. In one embodiment, the plasma spacers 88, 90 comprise dielectric rods extending the entire length of the electrodes 54, 56. The plasma spacers 88, 90 may be held in place in numerous ways, such as by ceramic clamps (not shown).

Figure 3:
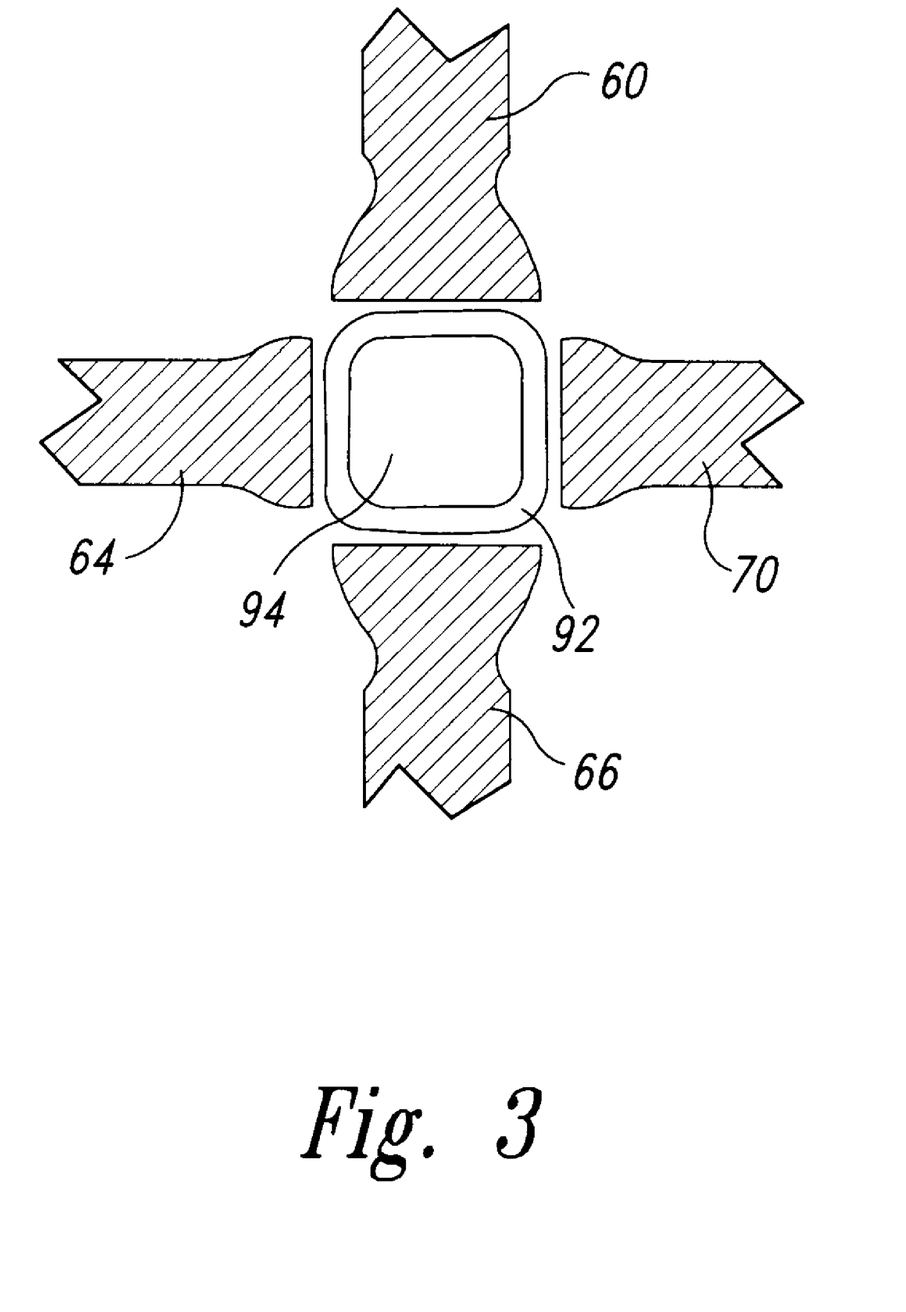
FIG. 3 is a cross-sectional view of the laser shown in FIG. 2, showing the formation of an ion sheath within a laser bore.

By driving the plasma in the laser bore 58 with ungrounded potentials from all four electrode surfaces 72–78, the laser 50 of the present invention provides more laser power at a lower temperature than prior art lasers using grounded sidewalls (e.g., wall surfaces 28, 30 of FIG. 1). A primary reason for the increased power and lower temperature is because driving all four electrode surfaces 72–78 with ungrounded potentials creates an ion sheath 92 along substantially the entire periphery of the laser bore 58 and surrounds a laser plasma 94 as shown in FIG. 3. The ion sheath 92 is a ring of ions that is formed adjacent to each of the electrode surfaces 72–78 while the electrode surfaces are being driven with ungrounded potentials. The ion sheath 92 reduces losses of the laser plasma 94 caused by plasma electrons combining with ions in the electrode surfaces 72–78. The ion sheath also helps to create a uniform temperature distribution within the laser bore 58 at a lower average temperature than the prior art laser shown in FIG. 1. A more detailed discussion of ion sheaths can be found in Vitruk et al, "The Characteristics and Stability of High Power Transverse Radio Frequency Discharges for Waveguide $CO_2$ Slab Laser Excitation," in *J. Phys. D. Appl. Phys.* 25 (1992), 1767–1776. It will be appreciated that the ion sheath 92 shown in FIG. 3 is illustrative only—the actual ion sheath is unlikely to be so well defined.

In preventing the plasma electrons from contacting the electrode surfaces 72–78, the ion sheath prevents the electrons of the plasma within the laser bore 58 from combining with the ions on the electrode surfaces 72–78, thereby reducing plasma electrode losses compared to prior art lasers. Reducing plasma electrode losses reduces the electron temperature within the laser bore 58, increases plasma electron density, and provides more uniform power. These features increase laser efficiency such that laser output is greater for a given amount of input power.

Another advantage of driving all four electrode surfaces 72–78 is that the spatial distribution of laser gain within the laser bore 58 as more uniform than with prior art lasers, such as the laser 10 of FIG. 1, that use grounded wall surfaces. In the prior art laser 10 of FIG. 1, the laser gain within the laser bore 22 is at a maximum immediately adjacent the electrode surfaces 18, 20, somewhat less in the middle, and at a minimum adjacent the grounded wall surfaces 28, 30. In contrast, the laser gain within the laser bore 58 of the laser 50 is substantially uniform with slight maxima immediately adjacent the electrode surfaces 72–78. All four electrode surfaces 72–78 contribute equally in dissipating the heat within the laser bore 58, which reduces the overall temperature within the laser bore 58.

Figure 4:
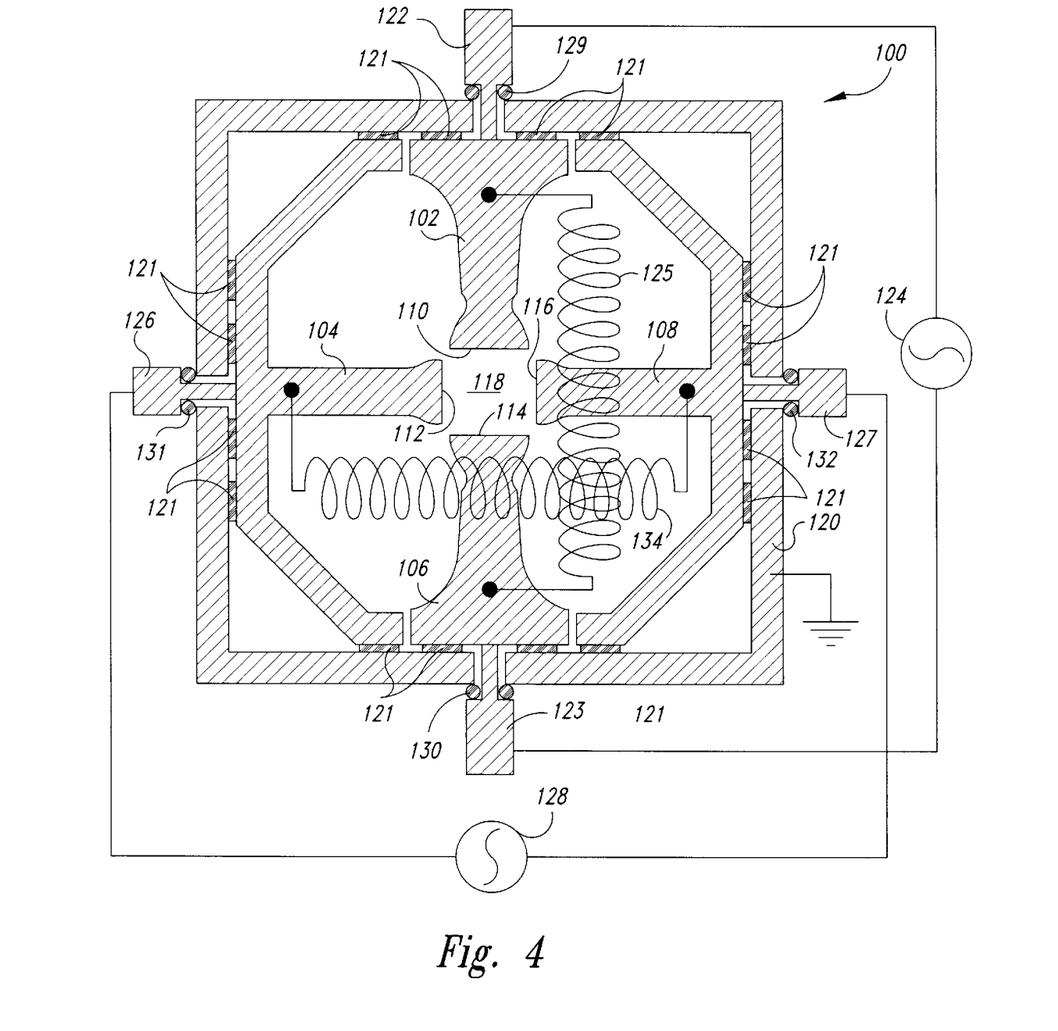
FIG. 4 is a cross-sectional view of a sealed gas laser according to a second embodiment of the present invention.

A gas laser 100 according to a second embodiment of the invention is shown in FIG. 4. The gas laser 100 differs from the gas laser 50 shown in FIG. 2 in that the gas laser 100 includes four electrodes 102, 104, 106, 108 each having one of four electrode surfaces 110, 112, 114, 116, respectively, defining a rectangular, longitudinally extending laser bore 118. The four electrodes 102–108, along with a supply of laser gas, are positioned within a grounded housing 120. The electrodes 102–108 are supported and insulated from the housing by insulating spacers 121.

The four electrodes 102–108 are driven in such a way that the first electrode 102 is driven 90 degrees ahead of the second electrode 104, 180 degrees ahead of the third electrode 106, and 270 degrees ahead of the fourth electrode 108. To accomplish such quadra-phase excitation, the first and third electrodes 102, 106 are coupled by respective first and second input lines 122, 123 to a first RF voltage source 124. The first electrode 102 is also coupled to the third electrode 106 by a coil 125. The second and fourth electrodes 104, 108 are coupled by respective third and fourth input lines 126, 127 to a second RF voltage source 128 that lags the first voltage source by 90 degrees. The input lines 122, 123, 126, 127 are supported on, and insulated from the housing 120 by non-conductive O-rings 129, 130, 131, 132, respectively. In addition, the fourth electrode 108 is coupled by a second coil 134 to the second electrode 104 such that the fourth electrode 108 lags the second electrode 104 by 180 degrees. Circuits having a second voltage source that lags a first voltage source are well known in the art, so a discussion of such circuits is omitted here for simplicity.

By driving the plasma in the laser bore 118 with ungrounded potentials from all four electrodes 102–108, the laser 100 also provides improved laser efficiency compared to prior art lasers. Like the laser 50 of FIG. 2, the laser 100 of FIG. 4 forms an ion sheath within the laser bore 118 adjacent the electrode surfaces 110–116. The ion sheath formation would be similar to that shown in FIG. 3 except that the plasma electrons within the laser bore 118 would move in a circular motion by being drawn toward each of the electrodes 102–108 in sequence based on the four phases in which the electrodes are being driven. The plasma ions would remain adjacent to the electrode surfaces 110–116 to form the ion sheath and restrict the ability of the plasma electrons to reach the electrode surfaces 110–116. Such an ion sheath reduces the electron temperature within the laser bore 118, increases plasma electron density, and provides more uniform power, thereby increasing laser efficiency.

One advantage of the laser 100 of FIG. 4 compared to the laser 50 of FIG. 2 is that the laser 100 does not employ the Pyrex rods 88–90 to prevent plasma formation outside of the laser bore 118. Driving the electrodes 102–108 in 90° phase shift ensures that each of the electrodes 102–108 is only 90 degrees out of phase with respect to immediately adjacent electrodes. As a result, the potential difference between adjacent electrodes is insufficient to achieve plasma breakdown such that no plasma forms outside of the laser bore 118.

Figure 5:
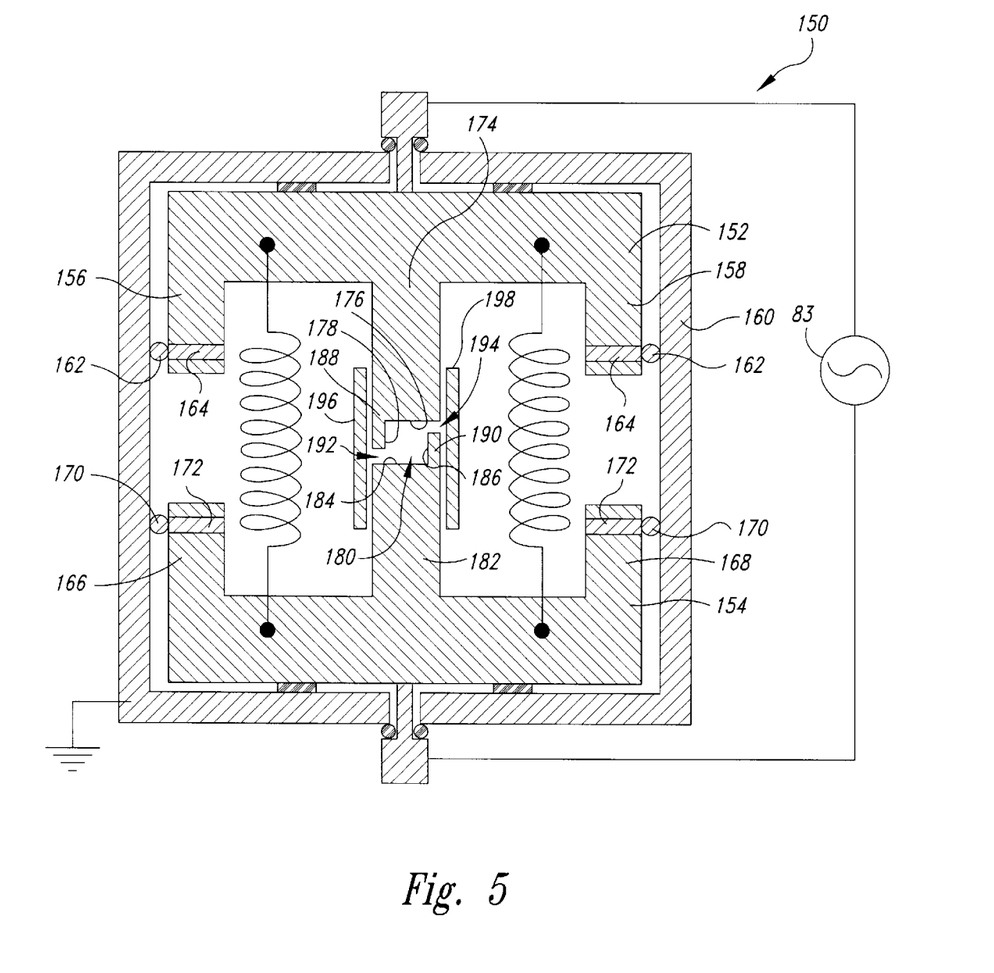
FIG. 5 is a cross-sectional view of a sealed gas laser according to a third embodiment of the present invention.

A gas laser 150 according to a third embodiment of the invention is shown in FIG. 5. The gas laser 150 differs from the gas laser 50 shown in FIG. 2 in that the gas laser 150 includes electrodes 152, 154 with a different shape than the electrodes 54, 56 shown in FIG. 2. The first electrode 152 has first and second side arms 156, 158 that are spaced apart from, and held in place with respect to, a housing 160 by insulating ball spacers 162 and set screws 164. Similarly, the second electrode 154 includes first and second side arms 166, 168 that are spaced apart from, and held in place with respect to, the housing 160 by insulating ball spacers 170 and set screws 172. The first electrode 152 also includes a central arm 174 having longitudinal first and second electrode surfaces 176, 178 arranged perpendicular to each other and forming two longitudinal sides of a longitudinal laser bore 180. Similarly, the second electrode 154 also includes a central arm 182 having longitudinal first and second electrode surfaces 184, 186 arranged perpendicular to each other and opposite the first and second surfaces 176, 178, respectively, and defining two more longitudinal sides of the laser bore 180. The operation of the laser 150 will be substantially identical to the operation of the laser 50 shown in FIG. 2 with an ion sheath being formed in the laser bore 180, thereby producing a laser output in a highly efficient manner as discussed above with respect to FIGS. 2–3.

The second electrode surfaces 178, 186 are formed on extension flanges 188, 190 of the central arms 174, 182, respectively, of the first and second electrodes 152, 154. A first gap 192 is formed between the end of the flange 188 of the central arm 174 of the first electrode 152 and first electrode surface 184 of the central arm 182 of the second electrode 154, and a second gap 194 is formed between the end of the flange 190 of the central arm 182 of the second electrode 154 and first electrode surface 176 of the central arm 174 of the first electrode 152. To prevent formation of discharge plasma outside the laser bore 180, the gas laser 150 includes first and second plate spacers 196, 198 adjacent the first and second gaps 192, 194, respectively. The plate spacers 196, 198 may be metal at a floating potential or a ground potential and extend the entire length of the electrodes 152, 154. The plate spacers 196, 198 prevent plasma discharge outside of the laser bore 180 because the potential differences between the electrode central arms 174, 182 and the plate spacers 196, 198 are insufficient to discharge plasma.

Figure 6:
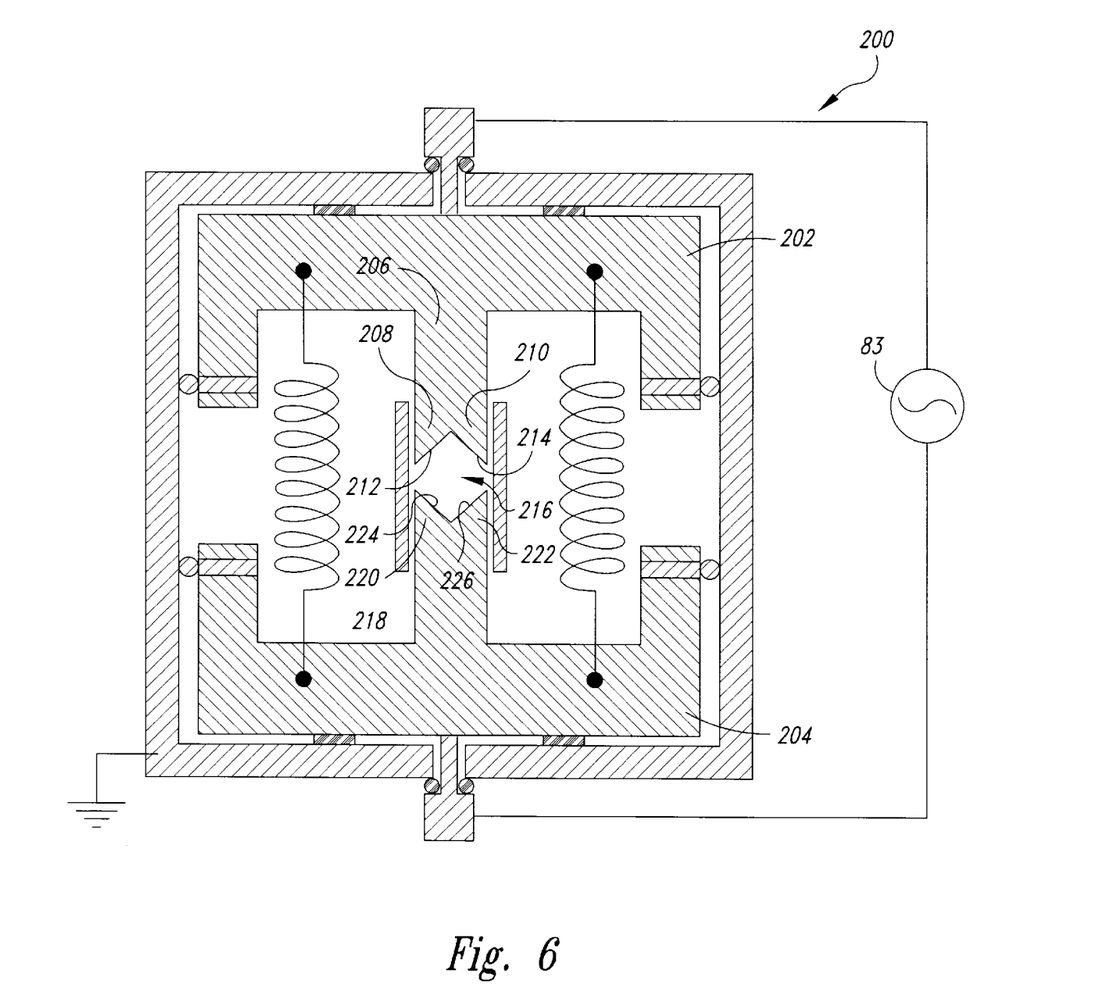
FIG. 6 is a cross-sectional view of a sealed gas laser according to a fourth embodiment of the present invention.

A gas laser 200 according to a fourth embodiment of the invention is shown in FIG. 6. The gas laser 200 is substantially identical to the gas laser 150 shown in FIG. 5 except that the gas laser 200 includes first and second electrodes 202, 204 of slightly different shape than the electrodes 152, 154 of the gas laser 150. The first electrode 202 has a central arm 206 with longitudinal first and second flanges 208, 210 having first and second electrode surfaces 212, 214 arranged perpendicular to each other and forming two sides of a longitudinal laser bore 216. Similarly, the second electrode 204 has a central arm 218 with longitudinal first and second flanges 220, 222 having first and second electrode surfaces 224, 226 arranged perpendicular to each other, opposite first and second surfaces 212, 214, respectively, and defining two more longitudinal sides of the laser bore 216. The gas laser 200 operates substantially identically to the gas laser 150 to form an ion sheath within the laser bore 216 and provide laser output more efficiently than prior art lasers.

Figure 7:
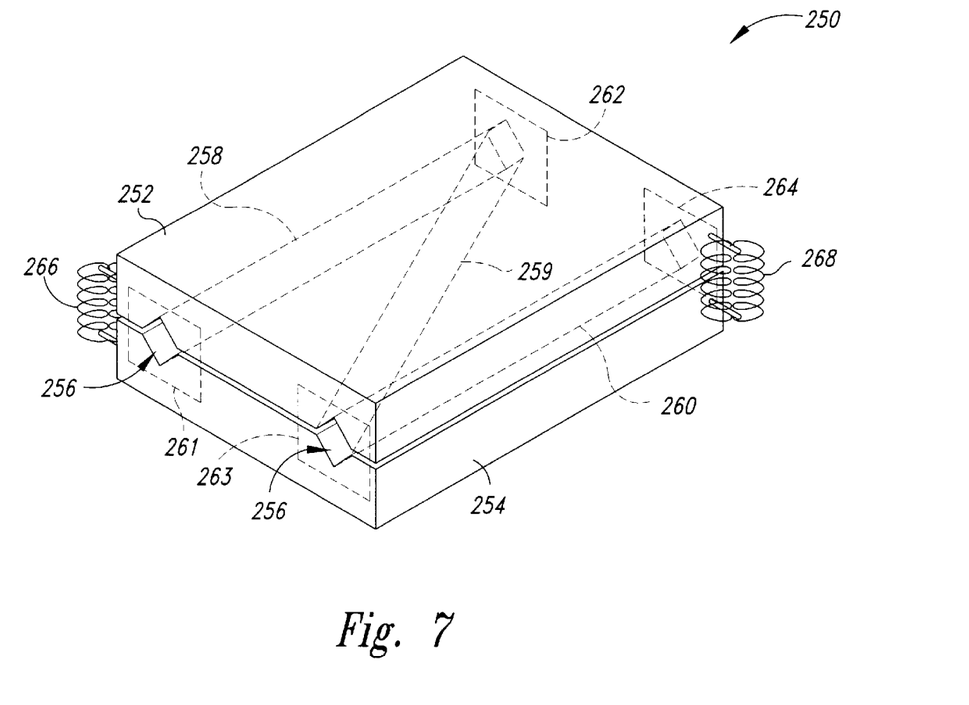
FIG. 7 is a perspective view of a sealed gas laser according to a fifth embodiment of the present invention.

A gas laser 250 according to a fifth embodiment of the invention is shown in FIG. 7. The gas laser 250 includes first and second electrodes 252, 254 forming a Z-folded laser bore 256. The Z-folded laser bore 256 includes first, second and third bore sections 258, 259, 260 in which a laser beam is formed. Appropriate resonator mirrors 261, 262, 263, 264 are positioned at the ends of the laser bore sections 258, 262 to direct the laser beam in a Z-folded path within the Z-folded laser bore 256. Any of the resonators 261-264 may be partially reflective to allow a portion of the laser beam to escape the laser bore 264. Each of two sets of coils 266, 268 are connected between the first and second electrodes 252, 254 to provide bi-phase excitation of the laser gas within the Z-folded laser bore 256.

Figure 8:
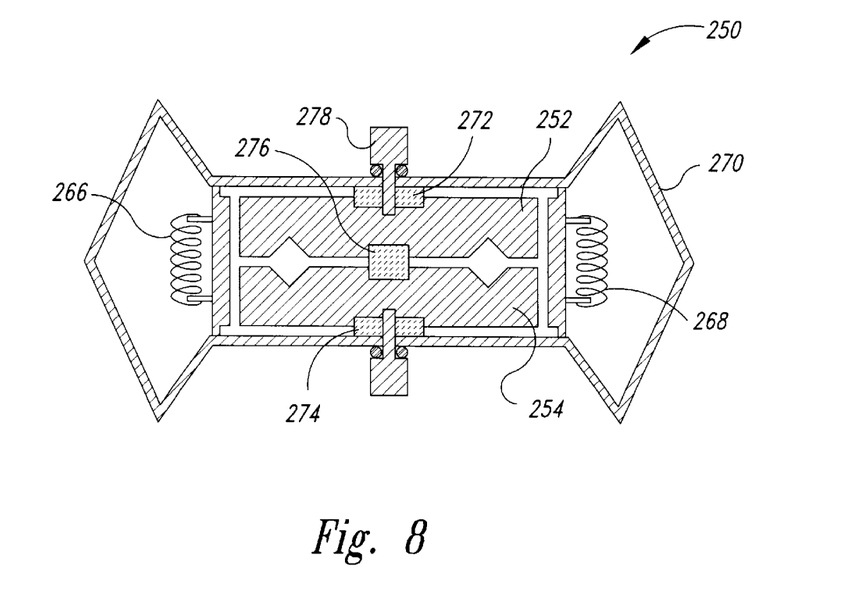
FIG. 8 is a cross-sectional view of the gas laser of FIG. 7 taken along line A—A.

A cross-sectional view of the gas laser 250 taken along line AA of FIG. 7 is shown in FIG. 8. A laser housing 270 encloses the electrodes 252, 254 and the coils 266, 268. The electrodes 252, 254 are supported and insulated by ceramic spacers 272, 274 with respect to the laser housing 270. In addition, a central ceramic spacer 276 is employed to space the electrodes 252, 254 at a desired distance from each other. The first and second electrodes 252, 254 are coupled by input lines 278, 279 to an RF power source 280 to supply power to the first electrode 252 and to the second electrode 254 via the coils 266, 268.

The operation of the gas laser 250 is substantially identical to the gas laser 50 shown in FIG. 2 except for the Z-folded path of the laser beam formed within the Z-folded laser bore 256. The electrodes 252, 254 form four sides of each of the laser bore sections 258, 262 to create ion sheaths in each of the laser bore sections 258, 262. As such, the gas laser 250 provides more efficient laser generation than prior art lasers similar to the manner discussed above with respect to FIGS. 2–4. In addition, the Z-folded laser bore 256 provides a laser beam path of increased length, thereby increasing laser power compared to a straight laser bore, such as the laser bore 58 shown in FIG. 2.

Based on the foregoing discussion, it will be appreciated that the gas laser embodiments discussed herein provide increased laser efficiency and laser power extraction per unit of discharge length compared to prior art lasers. The ion sheaths formed within the laser bores of the lasers discussed above greatly reduces plasma losses compared to prior art lasers. Such a reduction in plasma losses enables the gas lasers to provide the increased laser efficiency at a lower gas temperature, thereby reducing the need for additional cooling mechanisms.

It should be understood that even though numerous features and advantages of the present invention have been set forth in the foregoing description, the above disclosure is illustrative only. Changes may be made in detail and yet remain within the broad principles of the present invention.

We claim:

1. A single bore gas laser, comprising:

a hollow housing containing a laser gas medium; and a plurality of electrically-conductive electrodes contained within the housing, the plurality of electrodes including first, second, third, and fourth electrode surfaces surrounding and defining a single laser bore, the laser bore being the only laser bore of the gas laser, the first and third electrode surfaces facing each other and each having an ungrounded electrical potential that excites a plasma within the laser bore, the second and fourth electrode surfaces facing each other and each having an ungrounded electrical potential that excites the plasma within the laser bore.

2. The gas laser of claim 1 wherein the plurality of electrodes includes first and second electrodes and the first and second electrode surfaces are part of the first electrode and the third and fourth electrode surfaces are part of the second electrode.

3. The gas laser of claim 1 wherein the first and fourth electrode surfaces are separated by a first gas gap that insulates the first electrode surface from the fourth electrode surface, and the second and third electrode surfaces are separated by a second gas gap that insulates the second electrode surface from the third electrode surface.

4. The gas laser of claim 3, further comprising:
an electrically-insulative first spacer positioned outside the laser bore and adjacent the first gas gap; and
an electrically-insulative second spacer positioned outside the laser bore and adjacent the second gas gap, the first and second spacers restricting plasma formation between the first and second electrodes outside the laser bore.

5. The gas laser of claim 3, further comprising:
a first metal spacer positioned outside the laser bore and adjacent to the first gas gap; and
a second metal spacer positioned outside the laser bore and adjacent to the second gas gap, the first and second metal spacers each having a floating electrical potential that restricts plasma formation between the first and second electrodes outside the laser bore.

6. The gas laser of claim 1 wherein the first, second, third, and fourth electrode surfaces surround and define a first bore section of the laser bore, and the plurality of electrodes further includes fifth, sixth, seventh, and eighth electrode surfaces surrounding and defining a second bore section of the laser bore, each of the fifth through eighth electrode surfaces having an ungrounded electrical potential that excites a plasma within the second bore section of the laser bore.

7. The gas laser of claim 6, further including a resonator mirror positioned to direct a laser discharge between the first bore section of the laser bore and the second bore section of the laser bore.

8. The gas laser of claim 1, further comprising:
a power source coupled to each of the electrode surfaces, the voltage source supplying a radio frequency voltage to each of the electrode surfaces to create the plasma with the laser bore.

9. The gas laser of claim 1 wherein the first through fourth electrode surfaces are driven in such a manner that the first electrode surface is 90 degrees out of phase with respect to the second and fourth electrode surfaces and 180 degrees out of phase with respect to the third electrode surface.

10. A single bore gas laser, comprising:
a hollow housing containing a laser gas medium; and
a plurality of electrically-conductive electrodes contained within the housing, the electrodes surrounding and defining a single laser bore, the laser bore being the only laser bore of the gas laser, each of the electrodes having a controlled, varying electrical potential that excites a plasma within the laser bore.

11. The gas laser of claim 10 wherein the plurality of electrically-conductive electrodes includes:

a first electrode with first and second surfaces defining two sides of the laser bore; and
a second electrode with first and second surfaces opposite the first and second surfaces, respectively, of the first electrode and thereby defining four sides of the laser bore.

12. The gas laser of claim 11 wherein the first surface of the first electrode is separated from the second surface of the second electrode by a first gas gap and the second surface of the first electrode is separated from the first surface of the second electrode by a second gas gap.

13. The gas laser of claim 12, further comprising:
an electrically-insulative first spacer positioned outside the laser bore and adjacent the first gas gap; and
an electrically-insulative second spacer positioned outside the laser bore and adjacent the second gas gap, the first and second spacers restricting plasma formation between the first and second electrodes outside the laser bore.

14. The gas laser of claim 12, further comprising:
a first metal spacer positioned outside the laser bore and adjacent the first gas gap; and
a second metal spacer positioned outside the laser bore and adjacent the second gas gap, the first and second metal spacers each having a floating electrical potential that restricts plasma formation between the first and second electrodes outside the laser bore.

15. The gas laser of claim 12 wherein the first and second surfaces of the first and second electrodes define a first bore section of the laser bore, and the first electrode further includes third and fourth surfaces defining two sides of a second bore section of the laser bore and the second electrode further includes third and fourth surfaces opposite the third and fourth surfaces of the first electrode and thereby defining four sides of the second bore section of the laser bore.

16. The gas laser of claim 15, further including a resonator mirror positioned to direct a laser discharge between the first bore section of the laser bore and the second bore section of the laser bore.

17. The gas laser of claim 10, further comprising:
a power source coupled to each of the electrodes, the voltage source supplying a radio frequency voltage to each of the electrodes to create the plasma within the laser bore.

18. The gas laser of claim 10 wherein the plurality of electrodes includes first, second, third, and fourth electrodes forming the laser bore, the first and third electrodes having surfaces facing each other across the laser bore and the second and fourth electrodes having surfaces facing each other across the laser bore, the surfaces of the electrodes defining four sides of the laser bore.

19. The gas laser of claim 18, further comprising one or more power sources that drive the first through fourth electrodes in such a manner that the first electrode is driven 90 degrees out of phase with respect to the second electrode, 180 degrees out of phase with respect to the third electrode, and 270 degrees out of phase with respect to the fourth electrode.

20. The gas laser of claim 10, further comprising:
a plurality of insulating spacers contacting and positioned between the electrodes and the housing, thereby insulating the electrodes from the housing.

21. A single bore gas laser, comprising:
a hollow housing containing a laser gas medium;
a plurality of electrically-conductive electrodes contained within the housing, the electrodes having four electrode surfaces surrounding and defining a single laser bore, the laser bore being the only laser bore of the gas laser the four electrode surfaces having electrical potentials that excite a plasma within the laser bore; and a first ion sheath formed within the laser bore adjacent to each of the four electrode surfaces, the first ion sheath restricting combination of ions from the plasma in the laser bore with electrons from the four electrode surfaces.

22. The gas laser of claim 21 wherein the plurality of electrically-conductive electrodes includes:

a first electrode with first and second electrode surfaces defining two sides of the laser bore; and a second electrode with first and second electrode surfaces defining opposite sides of the laser bore from the first and second electrode surfaces of the first electrode.

23. The gas laser of claim 21 wherein a first one of the electrode surfaces faces a second one of the electrode surfaces and a third one of the electrode surfaces faces a fourth one of the electrode surfaces, the first electrode surface being separated from the fourth electrode surface by a first gas gap and the second electrode surface being separated from the third electrode surface by a second gas gap.

24. The gas laser of claim 23, further comprising:

an electrically-insulative first spacer positioned outside the laser bore and adjacent the first gas gap; and an electrically-insulative second spacer positioned outside the laser bore and adjacent the second gas gap, the first and second spacers restricting plasma formation adjacent the gas gaps outside the laser bore.

25. The gas laser of claim 23, further comprising:

a first metal spacer positioned outside the laser bore and adjacent to the first gas gap; and a second metal spacer positioned outside the laser bore and adjacent to the second gas gap, the first and second metal spacers each having a floating electrical potential that restricts plasma formation adjacent to the gas gaps outside the laser bore.

26. The gas laser of claim 21 wherein the four electrode surfaces surrounding and defining a first bore section of the laser bore, and the plurality of electrodes further including four additional electrode surfaces surrounding and defining a second bore section of the laser bore, the four additional electrode surfaces having electrical potentials that excite a plasma within the second bore section of the laser bore; and the gas laser includes a second ion sheath formed within the second bore section of the laser bore adjacent each of the four additional electrode surfaces, the second ion sheath restricting combination of ions from the plasma in the second bore section of the laser bore with electrons from the four additional electrode surfaces.

27. The gas laser of claim 26, further including a resonator mirror positioned to direct a laser discharge between the first bore section of the laser bore and the second bore section of the laser bore.

28. The gas laser of claim 27, further comprising:

a power source coupled to each of the plurality of electrodes, the power source supplying a radio frequency voltage to each of the electrode surfaces to excite the plasma within the first and second bore sections of the laser bore.

29. The gas laser of claim 21 wherein the plurality of electrodes includes first, second, third, and fourth electrodes forming the laser bore, the first and third electrodes having surfaces facing each other across the laser bore and the second and fourth electrodes having surfaces facing each other across the laser bore, the surfaces of the electrodes defining four sides of the laser bore.

30. The gas laser of claim 21, further comprising one or more power sources that drive the four electrode surfaces in such a manner that a first one of the electrode surface is 90 degrees out of phase with respect to second and third ones of the electrode surfaces and 180 degrees out of phase with respect to a fourth one of the electrode surfaces.

31. A single bore gas laser, comprising:

an elongated hollow housing containing a laser gas medium;

an RF power source for producing radio frequency power;

a first electrode coupled to the RF power source, the first electrode having elongated first and second electrode surfaces defining two sides of an elongated single laser bore within the housing, the laser bore being the only laser bore of the gas laser; and a second electrode coupled to the RF power source, the second electrode having elongated third and fourth electrode surfaces defining an additional two sides of the laser bore and facing the first and second electrode surfaces, each of the electrode surfaces receiving radio frequency power from the RF power source such that the first and second electrode surfaces are driven by the RF power source with a varying electrical potential that is of opposite polarity to a varying electrical potential of the third and fourth electrode surfaces.

32. The gas laser of claim 31 wherein the first and fourth electrode surfaces are separated by a first gas gap that insulates the first electrode surface from the fourth electrode surface and the second and third electrode surfaces are separated by a second gas gap that insulates the second electrode surface from the fourth electrode surface.

33. The gas laser of claim 32, further comprising:

an electrically-insulative first spacer positioned outside the laser bore and adjacent the first gas gap; and an electrically-insulative second spacer positioned outside the laser bore and adjacent the second gas gap, the first and second spacers restricting plasma formation between the first and second electrodes outside the first laser bore.

34. The gas laser of claim 32, further comprising:

a first metal spacer positioned outside the laser bore and adjacent the first gas gap; and a second metal spacer positioned outside the laser bore and adjacent the second gas gap, the first and second metal spacers each having a floating electrical potential that restricts plasma formation between the first and second electrodes outside the laser bore.

35. The gas laser of claim 31 wherein the first electrode includes first and second electrode arms that include the first and second electrode surfaces, the first and second electrode arms being spaced from each other to form a first gas gap between the first and second electrode surfaces and wherein the second electrode includes third and fourth electrode arms that include the third and fourth electrode surfaces, the third and fourth electrode arms being spaced from each other to form a second gas gap between the third and fourth electrode surfaces.

* * * * *